United States Patent
Dvorkis et al.

[11] Patent Number: 5,859,417
[45] Date of Patent: Jan. 12, 1999

[54] OPTICAL SCANNERS HAVING DUAL SURFACE OPTICAL ELEMENTS FOR DUAL WORKING RANGES

[75] Inventors: Paul Dvorkis, Stony Brook; Edward Barkan, Miller Place; Howard Shepard, Great River; Vladimir Gurevich, Bohemia; Mark Krichever, Hauppauge; Boris Metlitsky; David Tsi, both of Stony Brook; Raj Bridgelall, Mount Sinai; Duanfeng He, Ronkonkoma; Joseph Katz, Stony Brook; Richard Isaac, East Northport; Joel Kahn, Rockville, all of N.Y.

[73] Assignee: Symbol Technologies, Inc., Holtsville, N.Y.

[21] Appl. No.: 912,147

[22] Filed: Aug. 15, 1997

Related U.S. Application Data

[63] Continuation of Ser. No. 405,585, Mar. 17, 1995, abandoned, which is a continuation-in-part of Ser. No. 268,982, Jun. 30, 1994, Pat. No. 5,742,038, which is a continuation-in-part of Ser. No. 314,519, Sep. 28, 1994, Pat. No. 5,506,392, which is a division of Ser. No. 109,021, Aug. 19, 1993, Pat. No. 5,352,922, which is a division of Ser. No. 735,573, Jul. 25, 1991, Pat. No. 5,278,397.

[51] Int. Cl.⁶ .................................................. G06K 7/10
[52] U.S. Cl. ........................................... 235/467; 235/462
[58] Field of Search .................................. 235/462, 467, 235/472, 454

[56] References Cited

U.S. PATENT DOCUMENTS

| | | |
|---|---|---|
| 3,051,051 | 8/1962 | Jeffree . |
| 3,396,344 | 8/1968 | Broom . |
| 3,780,270 | 12/1973 | Faulkner et al. . |
| 3,790,756 | 2/1974 | Graves et al. . |
| 3,871,748 | 3/1975 | Day . |
| 4,199,816 | 4/1980 | Humphrey . |
| 4,360,798 | 11/1982 | Swartz et al. . |
| 4,369,361 | 1/1983 | Swartz et al. . |
| 4,500,776 | 2/1985 | Laser . |
| 4,508,686 | 4/1985 | Shaber et al. . |

(List continued on next page.)

FOREIGN PATENT DOCUMENTS

| | | |
|---|---|---|
| 249713 | 12/1987 | European Pat. Off. ............... 235/462 |
| 0 385 478 | 5/1990 | European Pat. Off. . |
| 0 492 065 | 7/1992 | European Pat. Off. . |
| 589361 | 3/1994 | European Pat. Off. ............... 235/462 |
| 3602008 | 7/1987 | Germany ............................... 235/467 |
| 55-88172 | 7/1980 | Japan . |
| 61-120283 | 6/1986 | Japan .................................... 235/467 |
| 0093871 | 4/1989 | Japan . |
| 3-127191 | 5/1991 | Japan .................................... 235/467 |
| 0198175 | 8/1991 | Japan . |
| 40 6-150039 | 5/1994 | Japan .................................... 235/467 |
| WO 93/18478 | 9/1993 | WIPO . |
| 94-01835 | 1/1994 | WIPO .................................... 235/467 |

OTHER PUBLICATIONS

"Quick Check 500" Brochure, Photographic Sciences, 2 pages, 1989 no month.

Barkan, Automatic I.D. News, "Author Verifies the Key to Bar Codying Success", (Nov. 1988).

Grabowski, et al., "Code Reading Mechanical Scanning Gun", IBM Technical Disclosure Bulletin, vol. 5, No. 5 Oct. 1962 no month.

Primary Examiner—Don Wong
Assistant Examiner—Karl Frech
Attorney, Agent, or Firm—Fish & Richardson P.C.

[57] ABSTRACT

An optical scanner such as a bar code scanner includes a segmented fold mirror, the individual sections of which have different profiles. By directing the scanning laser beam across the fold mirror, a plurality of scan lines are created, at different distances from the scanner. This provides increased flexibility by extending the scanner's working range. In alternative embodiments, a collector mirror and/or a scanning mirror may be segmented. In addition, beam shaping may be provided by reflecting the beam from one or more aplanar surfaces.

11 Claims, 10 Drawing Sheets

U.S. PATENT DOCUMENTS

| | | |
|---|---|---|
| 4,538,895 | 9/1985 | Higgins et al. . |
| 4,555,164 | 11/1985 | Feinbloom . |
| 4,560,862 | 12/1985 | Eastman et al. ............... 235/467 |
| 4,570,057 | 2/1986 | Chadima, Jr. et al. . |
| 4,606,660 | 8/1986 | Bradshaw et al. . |
| 4,641,018 | 2/1987 | Mazumder et al. . |
| 4,652,750 | 3/1987 | Eastman et al. . |
| 4,705,939 | 11/1987 | Ulinski, Sr. . |
| 4,721,860 | 1/1988 | Troendle . |
| 4,777,357 | 10/1988 | Harada et al. . |
| 4,795,281 | 1/1989 | Ulinksi, Sr. et al. . |
| 4,820,911 | 4/1989 | Arackellian et al. ............ 235/467 |
| 4,822,986 | 4/1989 | Guthmueller et al. . |
| 4,825,048 | 4/1989 | Poland . |
| 4,826,269 | 5/1989 | Streifer et al. . |
| 4,841,129 | 6/1989 | Tawara et al. .................... 235/467 |
| 4,860,226 | 8/1989 | Martin et al. . |
| 4,894,790 | 1/1990 | Yotsuya et al. . |
| 4,896,026 | 1/1990 | Krichever et al. . |
| 4,916,298 | 4/1990 | Raphael . |
| 4,933,538 | 6/1990 | Heiman et al. . |
| 4,980,544 | 12/1990 | Winter . |
| 4,992,649 | 2/1991 | Mampe et al. . |
| 5,013,895 | 5/1991 | Iggulden et al. . |
| 5,034,904 | 7/1991 | Moy . |
| 5,047,617 | 9/1991 | Shepard et al. . |
| 5,064,258 | 11/1991 | Inokuchi et al. . |
| 5,067,093 | 11/1991 | Przybylowicz et al. . |
| 5,073,954 | 12/1991 | Van Tyne et al. . |
| 5,081,639 | 1/1992 | Synder et al. . |
| 5,115,334 | 5/1992 | Tomita . |
| 5,194,720 | 3/1993 | Reinnagel et al. . |
| 5,218,190 | 6/1993 | Hardesty et al. . |
| 5,229,591 | 7/1993 | Heiman et al. . |
| 5,235,167 | 8/1993 | Dvorkis et al. . |
| 5,250,791 | 10/1993 | Heiman et al. . |
| 5,280,161 | 1/1994 | Niwa . |

OPTICAL SCANNERS HAVING DUAL SURFACE OPTICAL ELEMENTS FOR DUAL WORKING RANGES

REFERENCE TO RELATED APPLICATIONS

This is a continuation of application Ser. No. 08/405,585, filed Mar. 17, 1995, now abandoned, which is a continuation in part of application Ser. No. 08/268,982, filed Jun. 30, 1994, now U.S. Pat. No. 5,742,638 which is a continuation in part of application Ser. No. 08/314,519, filed Sep. 28, 1994, now issued U.S. Pat. No. 5,506,392, which is a divisional of application Ser. No. 08/109,021, filed Aug. 19, 1993, now issued U.S. Pat. No. 5,352,922, which is a divisional of application Ser. No. 07/735,573, filed Jul. 25, 1991, now issued U.S. Pat. No. 5,278,397.

FIELD OF THE INVENTION

The invention relates generally to optical scanners, and in particular to scanners having dual or multiple working ranges.

Most optical scanners such as bar code scanners are adapted for use at a particular distance, or a range of distances, from an indicia to be scanned. If the user holds the scanner too close to the indicia, or too far away, the indicia and/or the flying spot beam will not be in focus, and decoding will not be possible.

Such scanners may not be particularly convenient in environments where a series of indicia to be read are presented to the scanner at various distances, and where it is difficult or impossible for the user to alter the distance between the scanner and the indicia. To deal with such situations, attempts have been made to expand the acceptable working range of conventional scanners, to give the user as much leeway as possible, and also to provide multi-distance scanners which can operate, for example, at a first working range or at a second working range according to the user's preference or requirements. One possibility is for the provision of a two-position switch on the scanner, with the scanner operating at a first working distance in a first position of the switch and at a second working distance in a second position. A disadvantage of such scanners is that they require additional moving parts to provide for operation at the two separate working ranges. Such systems are also not "automatic" in the sense that the user has manually to select the correct working range, according to the distance of the current indicia to be read; if the incorrect working range is chosen, a decode will not result.

One of the difficulties that bar code reader designers face when attempting to produce increased working ranges is that the greater the working range, and the greater the range of possible indicia that might be read, the lower tends to be the resultant signal to noise ratio in light that is reflected from the indicia. One approach for dealing with this involves the provision of non-conventional optics, in which the optics associated with either the laser or with the photodetector have two distinct focal points. An example of this is shown in U.S. Pat. No. 5,332,892, which is commonly assigned with the present application. In the device shown in that document, the two focal points are associated with corresponding circuitry to provide two separate channels of data derived from the scanned bar code. The two channels have differing resolutions. As the working angle and density vary, at least one of the resolutions is likely to be appropriate for sensing all or most of the bar coded data, regardless of the distance of the bar code with respect to the scanner and/or the size or density of the code. The scanning beams of bar code readers are typically derived from laser diodes. Such diodes are robust and relatively inexpensive, but they do suffer from the disadvantage that the beam emerging from a laser diode is astigmatic. The astigmatic laser diode can be characterised as having two apparent light sources spaced apart from each other along the optical path. One of the light sources lies in a horizontal plane, appears to be coming from inside the laser diode chip, and has a low angular divergence. The other apparent light source lies in a vertical plane, appears to be coming from a facet of the chip, and has a high angular divergence. The two apparent light sources, which are spaced apart from each other by typically about 20 micrometers, form two beam waists in different planes and in different directions, as measured relative to the planar junction of the chip.

The resultant relatively complex beam profile may need selective shaping before it can efficiently be used in an optical scanner. Some methods of providing such beam shaping are described in our co-pending U.S. patent application 08/268,982, filed Jun. 30, 1994.

A further difficulty that arises in current prior art scanners is that the signal may be drowned out by specular reflections from the surface on which the indicia to be read is printed.

SUMMARY OF THE INVENTION

Objects of the Invention

It is an object of the present invention at least to alleviate the problems of the prior art.

It is a further object to provide a simple and inexpensive means of adjusting the beam profile (cross section at a particular distance from the light source) as desired in either the X direction, or in the Y direction, or both.

It is a further object to provide a scanner which can operate at at least two distinct working distances, without the user having to select the appropriate working distance in advance.

It is a further object to provide a simple and inexpensive scanner which is capable of reading indicia at at least two separate, and distinct, distances.

It is a further object to provide a scanner in which problems due to specular reflections are reduced or eliminated.

Features of the Present Invention

According to one aspect of the present invention there is provided an optical scanner for reading indicia having areas of different light reflectivity, comprising:

a light source for producing a light beam;

a scanning optical element for receiving the light beam and producing a scanning outgoing light beam therefrom; and a multi-surface reflector having a first surface of a first profile and a second surface of a second profile, the scanner being adapted to read an indicia at a first distance or working range when the beam is reflected from the first surface and at a second distance or working range when the beam is reflected from the second surface.

In the preferred embodiment, the multi-surface reflector comprises a segmented mirror, a first segment of this mirror defining the first surface and a second segment defining the second surface. The mirror may either be a scanning mirror of the scanning optical element, or it may be a fold mirror. In the latter case, the fold mirror receives the scanning light beam from the scanning optical element, and directs it towards the indicia to be read.

Since the scanning beam is reflected from both first and second surfaces of the reflector, the resultant dynamic focus, or multi-focus, improves the working range of the scanner without the need for additional moving parts. Furthermore, no additional lenses or apertures are required.

The preferred device of the present invention allows one to obtain an increase in scan rate without changing the scan element. This provides increased aggressiveness (the ability to decode in a single scan) which would otherwise be lost by conventional methods of achieving dynamic focus using apertures or lenses.

By using a different profile for each of the reflector sections, the beam may be shaped as required at the various different working distances.

According to another aspect of the present invention there is provided an optical scanner for reading indicia having areas of differing light reflectivity, the scanner including a scanning optical element having a multi-surface reflector with a first surface having a first profile and a second surface having a second, different, profile.

According to another aspect of the invention there is provided an optical scanner for reading indicia having areas of differing light reflectivity, the scanner including a multi-surface fold mirror having a first surface of a first profile and a second surface of a second, different, profile.

According to another aspect of the invention there is provided an optical scanner for reading indicia having areas of differing light reflectivity, the scanner including a multi-surface collection mirror for collecting light reflected from the indicia, the collection mirror having a first surface of a first profile and a second surface of a second, different, profile.

According to another aspect of the invention there is provided a multi-range scanner assembly for electro-optically reading indicia having parts of differing light reflectivity on a target located at a variable distance from the assembly, comprising:

(a) a first light source for producing a first beam for short range scanning operations;

(b) a second light source for producing a second beam for long range scanning operations;

(c) a scanning element including a scanning mirror for causing the first and second beams to be alternately scanned over a field of view;

(d) a collection optical system for collecting light reflected from the field of view; and (e) an optical detector for detecting light directed thereto by the collection optical system and for generating electrical signals corresponding to the reflected light.

According to another aspect of the invention there is provided A multi-range scanner assembly for electro-optically reading indicia having parts of differing light reflectivity on a target located at a variable distance from the assembly, the scanner comprising:

(a) a light source for selectively producing a first beam for short range scanning operations and a second beam for long range scanning operations;

(b) a scanning element for causing the first and second beams to be scanned over a field of view;

(c) a collection optical system for collecting light reflected from the field of view; and (d) an optical detector for detecting light directed thereto by the collection optical system and for generating electrical signals corresponding to the reflected light.

According to another aspect of the invention there is provided an optical scanner for reading indicia having areas of differing light reflectivity, the scanning including a plurality of reflector surfaces for receiving light reflected from the indicia, a first reflector surface directing the reflected light to a first photodetector and a second surface directing the reflected light to a second photodetector.

Such an arrangement, focusing the returning light on two different spaced apart photodetectors, attempts to avoid specular reflections which may drown out one of the photodetectors, but not the other.

According to another aspect of the present invention there is provided an optical scanner for scanning indicia having areas of different light reflectivity, comprising:

a light source for producing a light beam;

a scanning optical element for receiving the light beam and producing a scanning light beam therefrom; and a beam-shaping reflector comprising an aplanar mirror for shaping the beam.

By reflecting from an aplanar surface, any desirable beam shape may be achieved. If the reflector is shaped both in the X direction and in the Y direction, beam shaping in both dimensions may be achieved. Alternatively, if a cylindrical mirror is used, the beam may be shaped only in one dimension. The aplanar surface may comprise the scanning mirror, or alternatively a stationary fold mirror.

Proper beam shaping using a cylindrical mirror in this way can enable the designer to reduce the spot size in the vertical (Y) direction at large scanning distances. This improves visibility. In addition, spot size for near distances (0–30 inches) is increased, thereby improving dot matrix performance.

In any of the above inventive concepts, the light source is preferably a laser beam. The laser source is preferably a VLD (visible laser diode). The VLD may have a lens in front of it, possibly a cylindrical lens, to provide some initial shaping of the beam.

The invention extends to any individual feature described above or set out in the specific description, and to any compatible combination of features. It is to be understood, in particular, that features shown in relation to one figure may be combined, where compatible, with features shown in connection with any other figure.

BRIEF DESCRIPTION OF THE DRAWINGS

The invention may be carried into practice in a number of ways and several specific embodiments will now be described, by way of example, with reference to the accompanying drawings, in which.

DETAILED DESCRIPTION OF THE PREFERRED EMBODIMENTS

Figure 1:
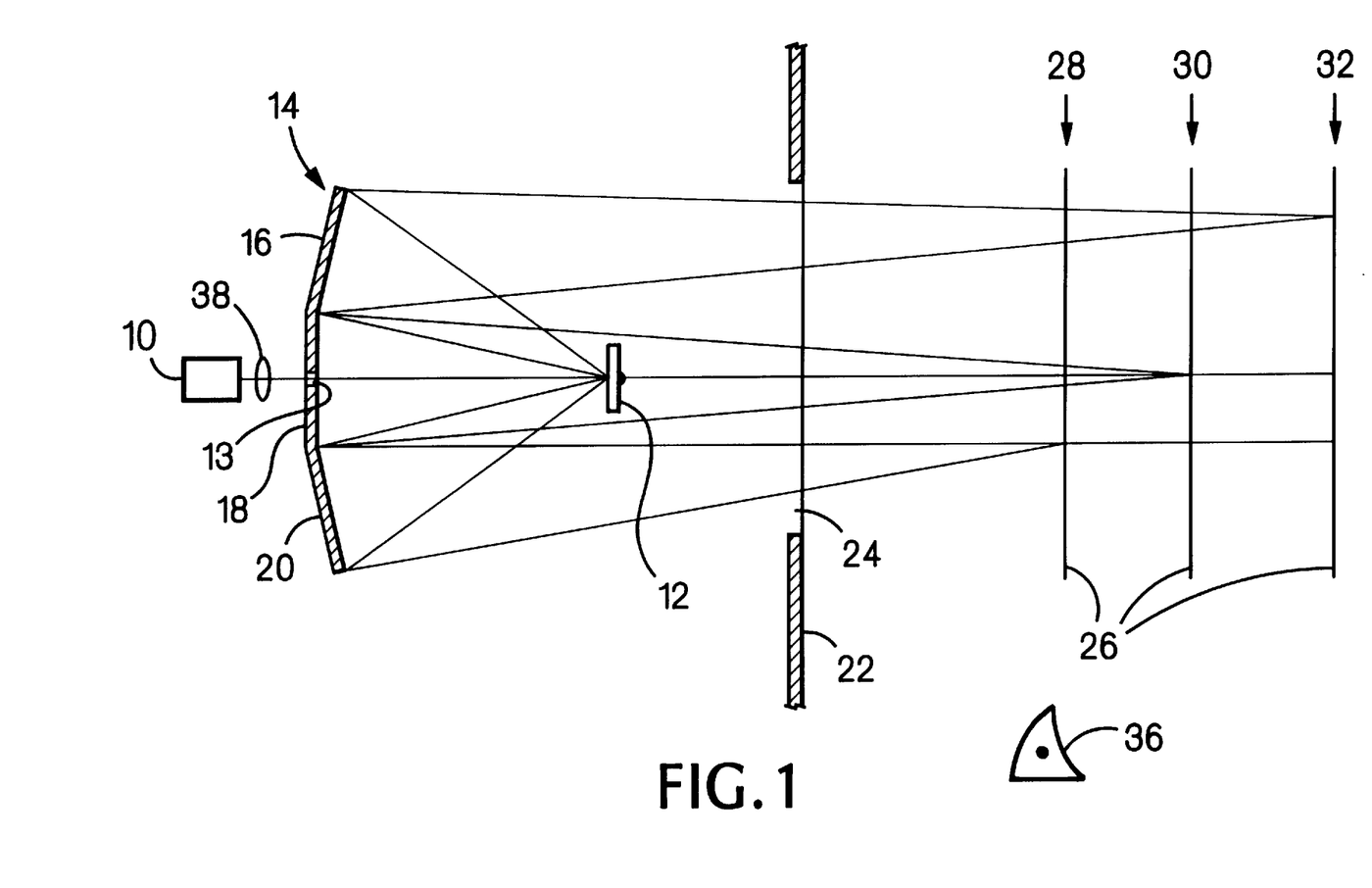
FIG. 1 shows a multiple-range laser scanner according to one embodiment of the present invention, utilising multiple-fold mirrors.

FIG. 1 shows a multiple-range laser scanner, for example for a bar code reader, comprising a first embodiment of the present invention. In the embodiment shown a laser diode 10 produces a light beam which is directed to a scanning mirror 12 via a small central hole 13 in a fold mirror 14. The fold mirror 14 is a segmented or multiple mirror comprising three separate is mirror portions 16,18,20. The mirror portion 16 is convex, the mirror portion 14 is planar and the mirror portion 18 is concave. As the scanning light beam produced by the scanning mirror 12 moves across the fold mirror 14 it strikes each of the mirror portions 16,18,20 in turn. The light reflected from the fold mirror passes out of the scanner housing 22 through a window or aperture 24 to impinge upon an indicia 26 to be read.

The indicia 26 is shown at three possible positions, a near position 28 corresponding to the working distance of the mirror portion 20, a middle distance 30 corresponding to the working distance of the mirror portion 18, and a far distance 32 corresponding to the working portion of the mirror portion 16. It will be appreciated, of course, that in a practical embodiment there will be considerably greater spacing between the positions 28,30 and 32: in the drawing the spacings are shown closer than they would be in reality, merely for the sake of clarity.

The result of the three separate mirror portions is that three separate scan lines are produced, the first at the position 28, the second at the position 30 and the third at the position 32. The intention is, accordingly, that whatever the distance of the indicia 26 from the scanner, it has a very good chance of being read by at least one of the scan lines. It will be appreciated of course that the indicia does not need to be exactly at one of the distances 28,30,32 in order to be decodable; there is in each case a substantial depth of field, and depending upon the actual distances these depths of field may even overlap so that they effectively merge into one complete "working region" within which the bar code symbol will almost certainly be decodable.

The mirror portions are suitably angled so that the respective scan lines lie on top of one another, but are merely focused at different distances.

It is not essential that there are exactly three mirror portions; there could be two, or more than three, according to the requirements of the particular application. The exact mirror profiles may also be chosen according to the particular application (e.g., cylindrical). The profiles chosen will depend upon the required working ranges and also upon the profile of the scanning mirror 12. The scanning mirror 12 may preferably be flat, but may in some circumstances be aplanar, for example cylindrical or spherical. The mirror 12 could also be replaced by a rotating prism, polygon, hologram, lens, zone plate, or any other convenient optical scanning element. If the scanning element comprises a polygon, each facet of the polygon may have a different curvature. In that case, the mirror portions 16,18,20 may (but need not) all have the same profile since the multiple working distances may then be determined by the curvature of the polygon facets. An exemplary polygon suitable for use with three planar fold mirror portions is shown at 36.

Further shaping of the beam may be achieved by the use of optics 38 in front of the laser 10.

In the embodiment of FIG. 1, light reflected back from the indicia 26 may either follow substantially the same path, in the reverse direction, to a photodetector (not shown) or alternatively there may be separate light collector optics (not shown) for that purpose.

Figure 2:
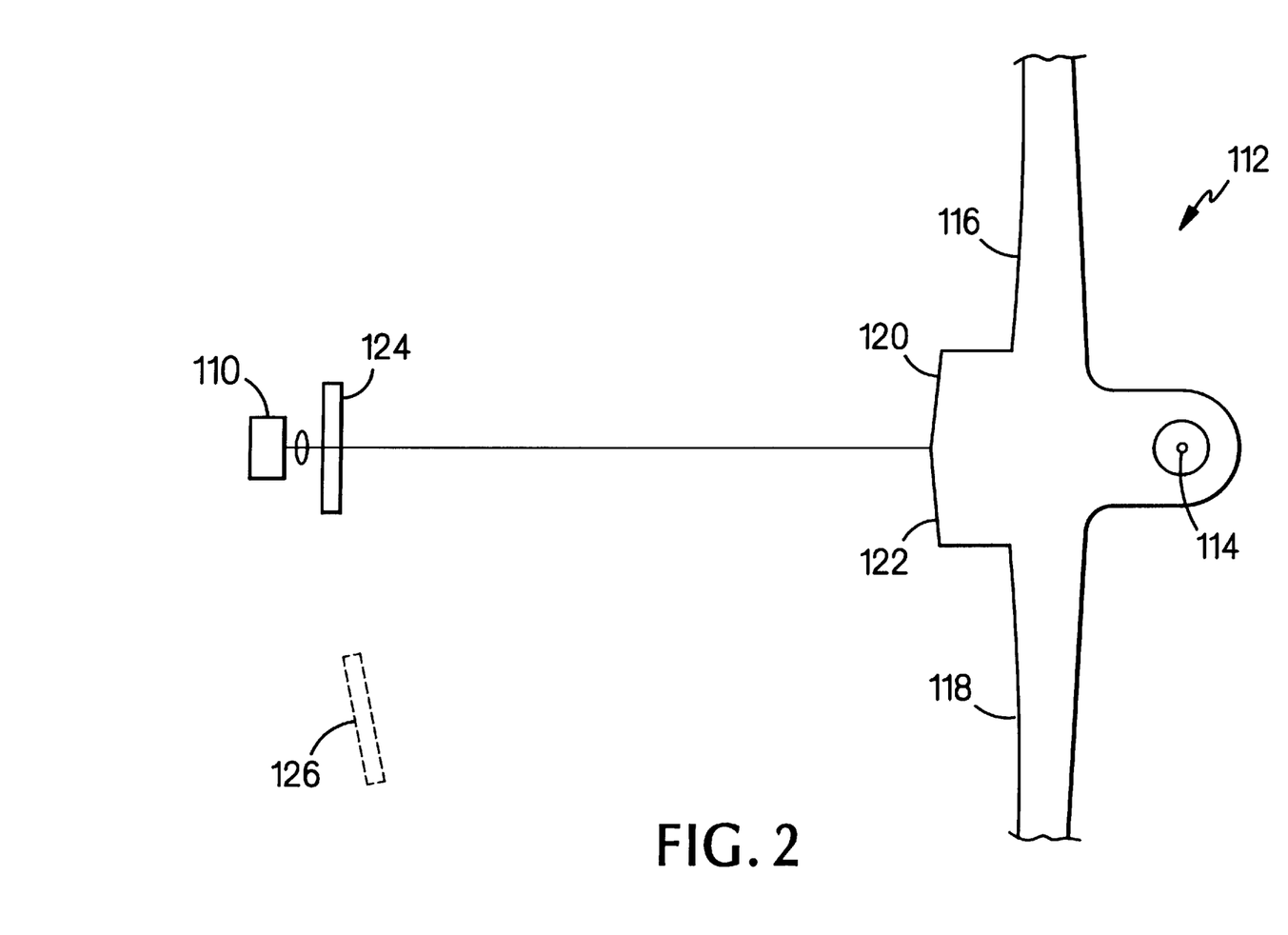
FIG. 2 shows another embodiment, namely a dual-range scanner with a scanning collector.

A further embodiment, this time comprising a dual-range scanner with a scanning detector, is shown in FIG. 2. A laser diode 110 directs a beam to a scanning mirror generally indicated at 112, which is arranged for oscillation about an axis 114. The mirror has four separate mirror portions the outer two of which 116,118 have a spherical profile, and the inner two of which 120,122 are planar. Laser light reflected from the mirror 112 takes the form of two separate scan lines which, because of the beam profile, have different working ranges from the bar code reader or other optical scanner.

In this embodiment, light reflected back from an indicia (not shown) impinges for a second time on the scanning mirror from where it is reflected back to a photodetector such as a photodiode 124. The photodiode of course has to be out of the way of the laser 110, and it is accordingly either positioned out of the plane of the paper or off to one side, as shown by the dotted lines 126.

It will be appreciated that the mirror 112 could have any required number of facets, each facet being of a different profile. The number of facets required, and the exact profiles, depend upon the application and the details are well within the expertise of a skilled artisan in the field.

Figure 3:
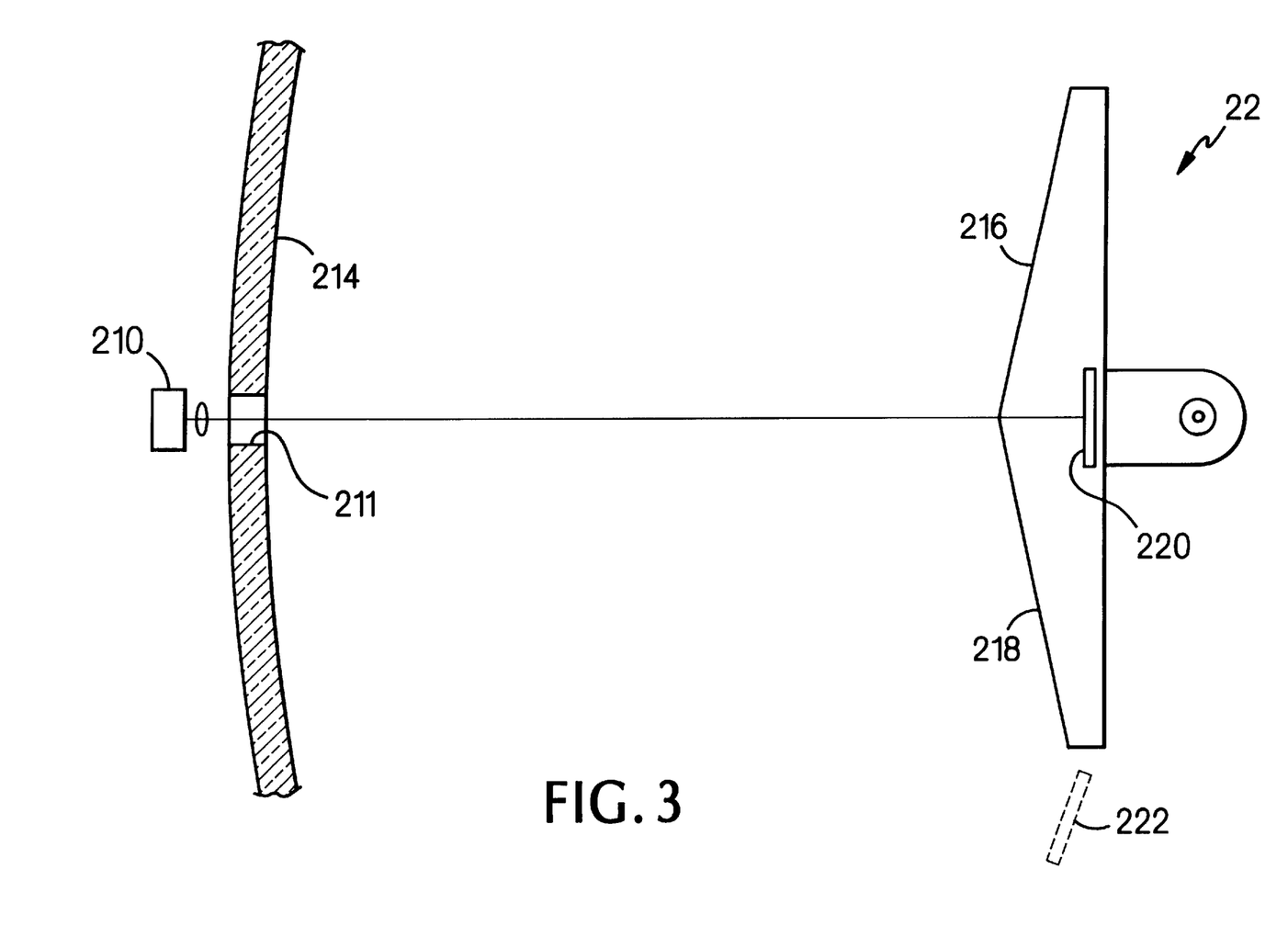
FIG. 3 shows yet another embodiment, namely a dual-range scanner having a separate collector.

A further embodiment is shown in FIG. 3. This illustrates a dual-range scanner having a separate collector mirror.

A laser 210 produces a light beam which passes through a small aperture 211 in a collector mirror 214. The beam impinges upon a scanning mirror 212 which has two separate surfaces, a first surface 216 of flat profile and a second surface 218 of cylindrical profile. The light is reflected from the mirror 212 to the collector mirror 214 and from there to an indicia to be read (not shown), off to the right of the drawing. Light reflected from the indicia is collected by the collector mirror 214 and is directed to a photodiode or other photodetector 220. This may be positioned either beneath the mirror 212 or offset to one side as shown by the dotted lines 222.

The two mirror portions 216,218 produce alternate scans having different working ranges.

Figure 4:
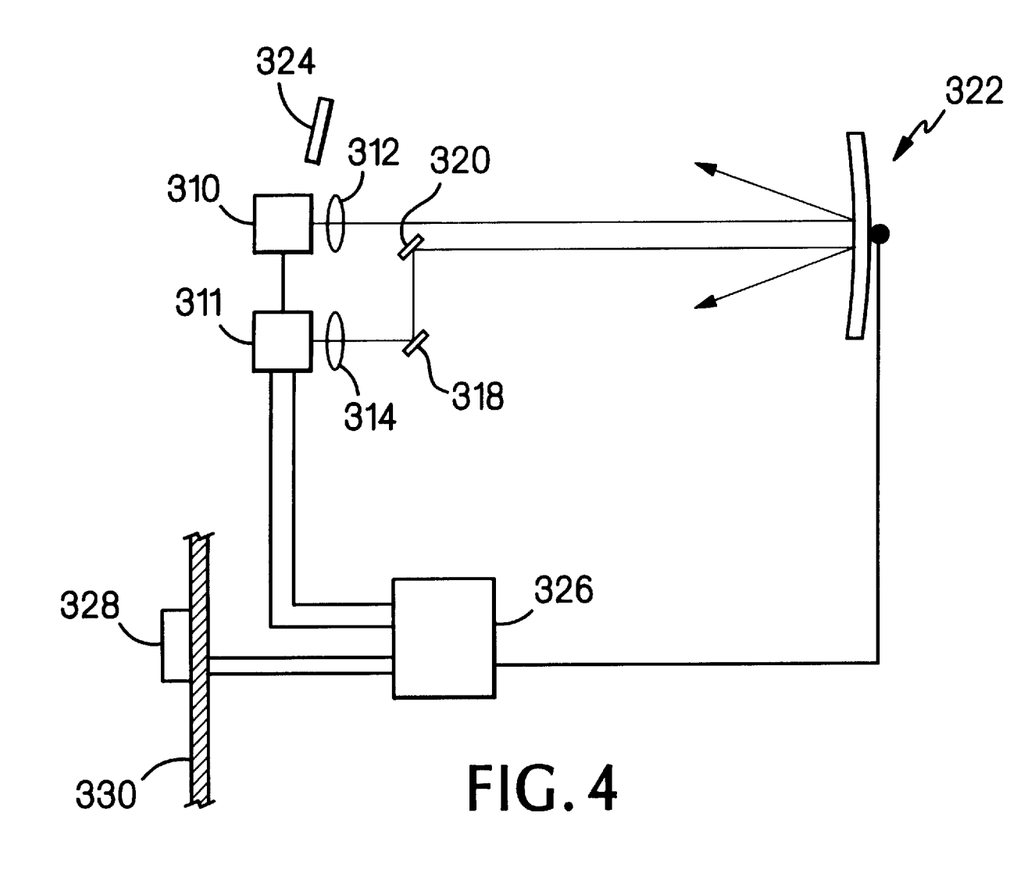
FIG. 4 shows yet another embodiment, namely a dual-range scanner using dual laser beams.

Turning now to FIG. 4, there is shown a further embodiment incorporating dual laser assemblies 310,311 emitting parallel beams. The laser assembly 310 is focused for short-range operation. This will be referred to, for shorthand, as the "short-range laser". Similarly, the laser assembly 311 is focused for long-range operation. This will be referred to, for shorthand, as the "long-range laser". Appropriate optics 312,314 define the working range and different beam profile characteristics of the lasers. Alternatively, the short-range laser, and its optics, may be identical with the long-range laser and its optics.

In another embodiment, the laser assemblies 310, 311 have lasers of different frequencies. Visible laser diodes are now available in two different wavelengths, 635 mm and 670 mm. The shorter wavelength device (635 mm) is more visible to the eye, and may preferably be used in high ambient light conditions or for aiming. Thus, in the preferred implementation, the 670 mm laser diode could be focused as the "short range laser" and the 635 mm laser diode focused as the "long range laser" since at long range the brightest beam is desirable for visibility and aiming. In high ambient light conditions, it is possible to use both lasers on, rather than alternate between the lasers. Although there will be two beams, if the beams are properly focused at the target plane so the spots are overlapping or very closely adjacent, the bar code symbol can be effectively read.

In still another embodiment, one of the laser assemblies 310, 311 is a visible laser and the other assembly an IR laser, whose beam is generally not visible to the eye. IR lasers are suitable for use in applications such as reading security badges that require an IR reading beam, reading direct thermal printed bar codes; and reading certain colored bar codes. The same arrangement as shown in FIG. 4 may be used, except there is no limitation that the optics be "short range" or "long range." As in the previous embodiment, one can alternate scans between lasers or use both lasers on.

The beam from the long-range laser 311 is reflected by a pair of parallel angled mirrors (or by an appropriately shaped prism) so that the two resultant laser beams are closely parallel to each other. The beams impinge upon a scanning mirror 322 from which they are reflected onto an indicia to be read (not shown, but off to the left of the drawing in FIG. 4).

Instead of there being separate long range and short range lasers, a single laser could be used instead with appropriate optics (for example a beam splitter).

Light reflected back from the indicia is collected by the mirror 322 (which acts as a collection mirror as well as a scanning mirror) and is directed to a photodetector 324).

Figure 5:
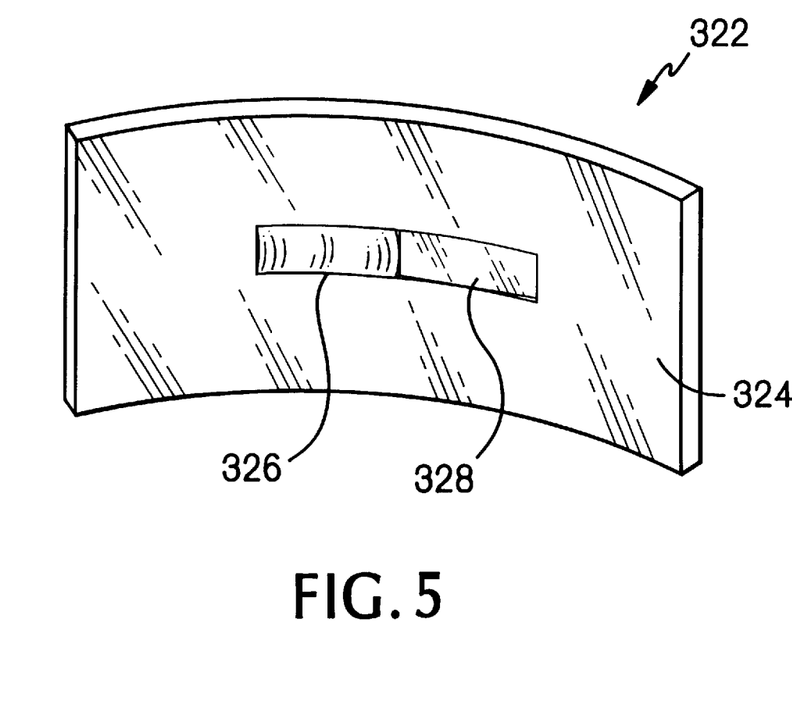
FIG. 5 shows in more detail a segmented scan mirror used in the embodiment of FIG. 4.

Details of the mirror 322 are shown in FIG. 5. As will be seen, the mirror is generally curved, and includes a large area of collecting surface 324 with a central section which is split into two. The left side of the central section 326 has a cylindrical profile, and the right hand section 328 a flat profile. The light beam from the short-range laser 310 impinges upon the portion 326, and the light from the long-range laser 310 impinges upon the portion 328.

In use, a laser control operates the lasers so that they are switched on and off alternately. The system is controlled so that two scans (left to right, then right to left) are performed with the long-range laser on, and then two scans with the short-range laser on. The alternation continues until a successful decode has been achieved.

The system also provides for an aiming mode which is initiated by a user selecting a first position of a trigger 328 on the scanner housing 330. In this mode, the controller 326 causes the long-range laser 311 to blink on and off while moving the mirror 322. In this mode the user can easily see the scanning beam and he can align the indicia accordingly. As soon as the indicia has been properly aligned with respect to the scanner, the user moves the trigger 328 to a second position to commence scanning proper.

Figure 6:
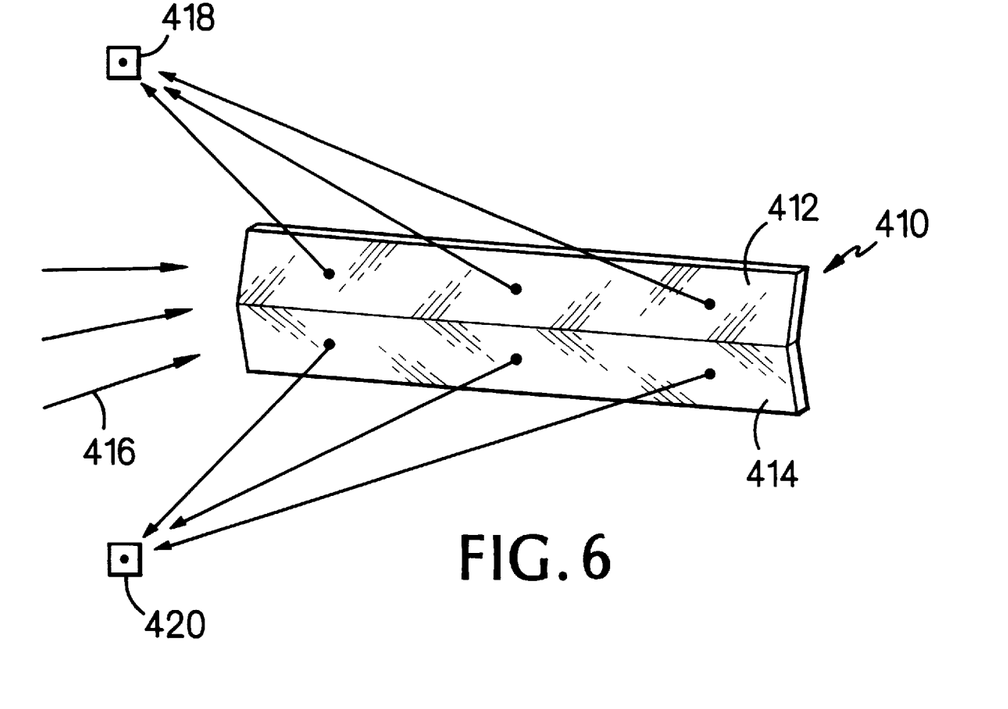
FIG. 6 shows yet a further embodiment, namely a scanner having a segmented collector mirror which directs the light to two separate photodetectors.
Figure 7:
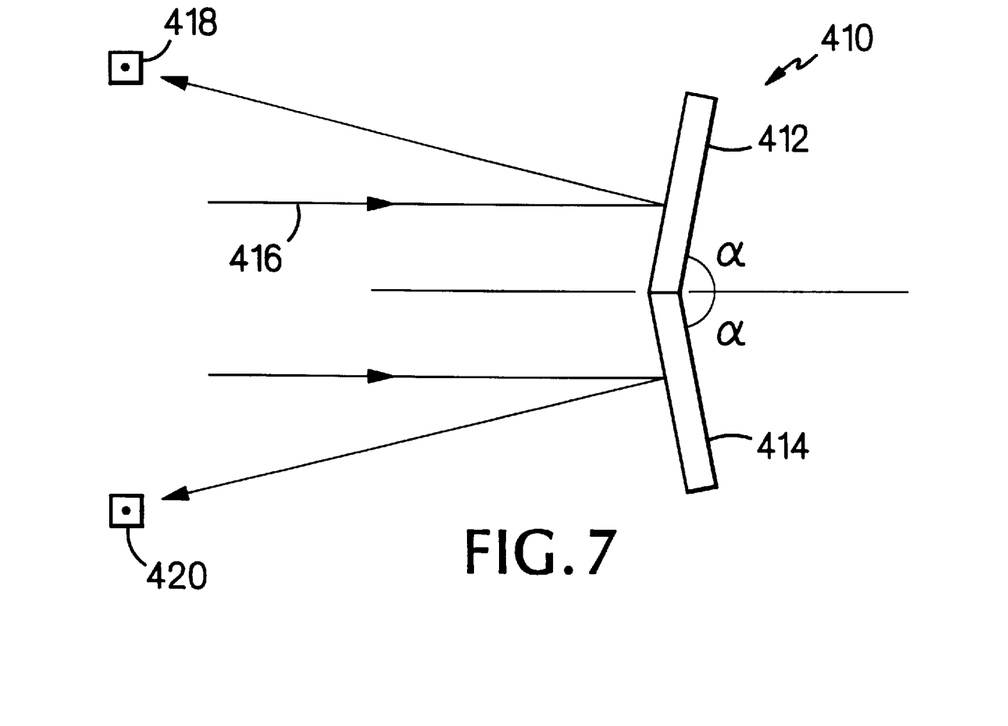
FIG. 7 is a central section through the segmented collector mirror of FIG. 6.

FIGS. 6 and 7 show a further embodiment in which the scanner includes a segmented collector mirror 410. The mirror has a first portion 412 which directs incoming light 416 from an indicia (not shown) to a first photodetector 418. A second portion 414 receives the reflected light 416 and directs it to a second photodetector 420.

The portions 412,414 may be of any convenient profile (for example planar or cylindrical) and are preferably angled at a common angle α from the general direction of the incoming reflected light 416.

The provision of two separate spaced apart photodetectors may enable the system to avoid being flooded by specular reflections from the indicia or from the surface on which the indicia is printed. A specular reflection may drown out one of the photodetectors, but not the other.

Figure 11:
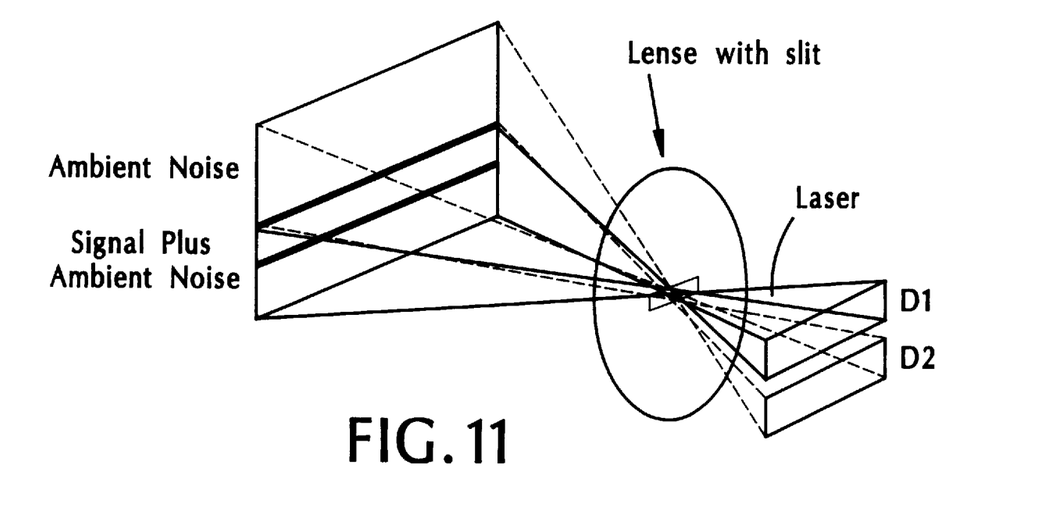
FIG. 11 shows an arrangement of dual photodetectors according to the present invention.
Figure 12:
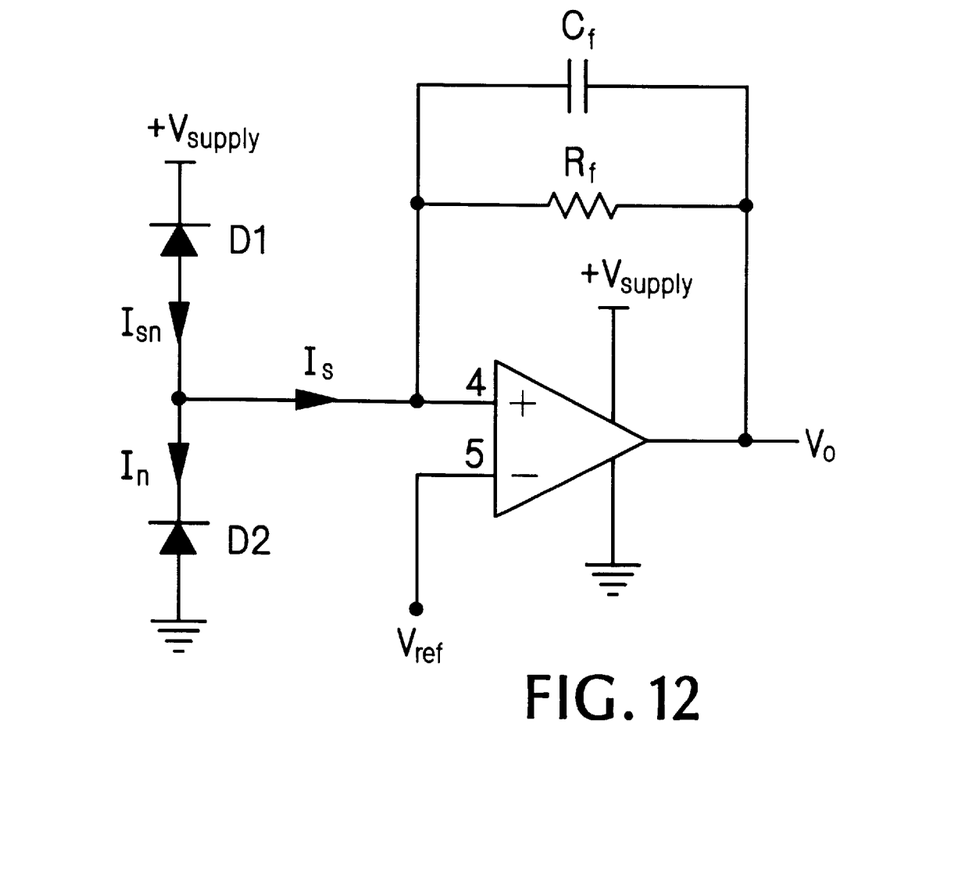
FIG. 12 is a circuit diagram of the dual photodetector arrangement of FIG. 11.

The embodiment of spaced photodetectors D1 and D2 is illustrated in FIG. 11, and the corresponding circuit for processing the signal in FIG. 12.

Systems having large optical field of view (such as non-retro reflective optics) generally suffer from background noise generated by ambient and artificial light sources. The front-end detector is flooded with signal power due to the background noise and renders the system inoperable. Background noise from artificial light sources will become more prominent as the trend towards high efficiency lighting sources continues. One common technique is to minimize the optical field of view by using a retro-reflective optical system. However, non-retro reflective optical systems are usually required for small scan engines. A technique that solves the problem of detector background noise corruption for ID scanning systems is described with reference to FIGS. 11–13.

FIG. 11 shows the general configuration of a system that provides an optoelectrical transducer front-end with the desired signal plus noise power from the first detector, and noise power only from the second detector. The invention provides a circuit, FIG. 12, to subtract these signals in order to yield only the desired signal power. Both collectors' field of view are designed to be rectangular, and as narrow as possible in order to keep the same background plane for noise matching. Optical filters and electronic gain matching may be used on each detector in order to match the background noise levels of each detector more closely.

Figure 13A:
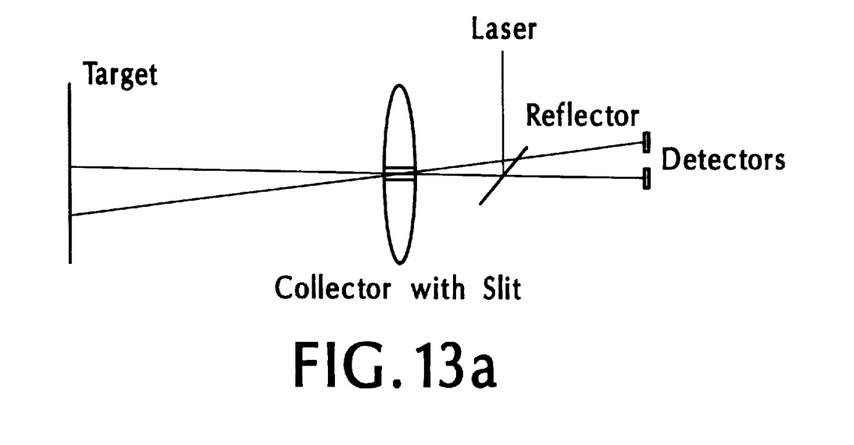
FIG. 13a is an arrangement of dual photodetectors illustrating a first embodiment of a collector/reflector positioning.

In order for the laser source path to be on axis to the first collector's field of view, several arrangements are proposed. The reflector (which may also be the scanning means) may be placed behind the collector as shown in FIG. 13a. However, the collector must have a narrow slit (or split in two) in order to permit passage of the laser beam.

Figure 13B:
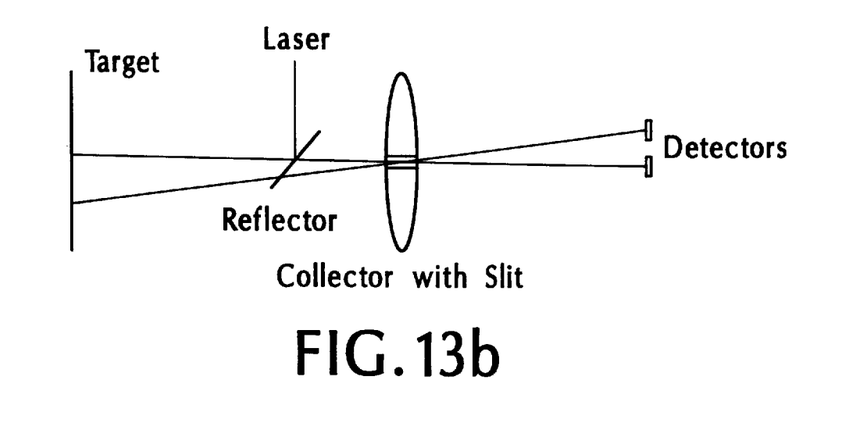
FIG. 13b is an arrangement of dual photodetectors illustrating a second embodiment of a collector/reflector positioning.

In order to avoid a split collector or collector with a slit, the reflector may be placed in front of it as shown in FIG. 13b. The reflector is designed so that it will obstruct only a small portion of the collected signal.

Figure 13C:
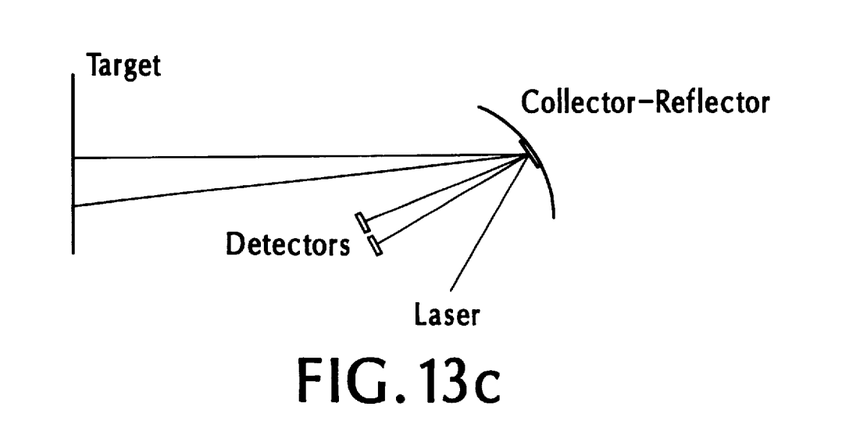
FIG. 13c is an arrangement of dual photodetectors illustrating a third embodiment of a collector/reflector positioning.

Another approach is to mount the reflector inside a collector mirror as shown in FIG. 13c. The reflector is designed long enough so as to accommodate a normal single line scan pattern.

FIG. 12 shows an implementation of an optoelectrical receiver circuit that is optimized for this noice cancellation technique. The two photodiode current sources may have their own front-end amplifiers each of whole signals are then sent to a subtractor. However, the topology shown avoids early saturation of the front-end circuit had there been separate amplifiers.

If the sensitivity of each detector is represented by S, then the photodiode currents are given by:

$$I_{sn} = S(P_s + P_{nl})$$

$$I_n = S(P_{n2})$$

where $P_s$ and $P_{nl}$ are the signal and ambient noise power respectively, as seen by the first detector, and $P_{n2}$ is the noise power seen by the second detector. The resultant signal to be amplified is given by:

$$I_g = I_{sn} - I_n = S(P_s + P_{nl}) - S(P_{n2}) = S(P_s + P_{nl} - P_{n2}) = I_s + (I_{nl} - I_{n2}) = I_s + I_t$$

where $I_{nl}$ and $I_{n2}$ are the noise currents in the photodoides due to the background light noise power seen by detectors one and two respectively.

If the two noise sources are highly correlated (true or artificial light background noise), then $I_t = 0$ and the resultant voltage produced by the front-end receiver will be all signal subject to the front-end frequency transfer function:

$$V_o(\omega) = \frac{-I_s R_f}{1 + j\omega R_f C_f}$$

Note that for uncorrelated noise such as photodiode shot noise due to DC currents, the noise will be $\sqrt{2}$ larger than with the usual single photodiode front-end. The total noise in this case is given by:

$$I_t = \sqrt{I^2_{n12} + I^2_{n22}}$$

Since this noise is uncorrelated:

$$In1 = In2 = I\hat{}$$

therefore $$I_t = \sqrt{2I}$$

The noise from background illumination usually remains dominant in a non-retro system even with this increase in shot noise. SNR may be improved if the second detector is turned off adaptively for cases where no artificial light noise sources are present.

Alternative implementations in both retro-reflective and non-reflective systems may also be used. In the non-reflective implementation, a Fresnel lens, holographic grating, or other optical element may be used in front of the photodetectors D1 and D2.

Figure 8:
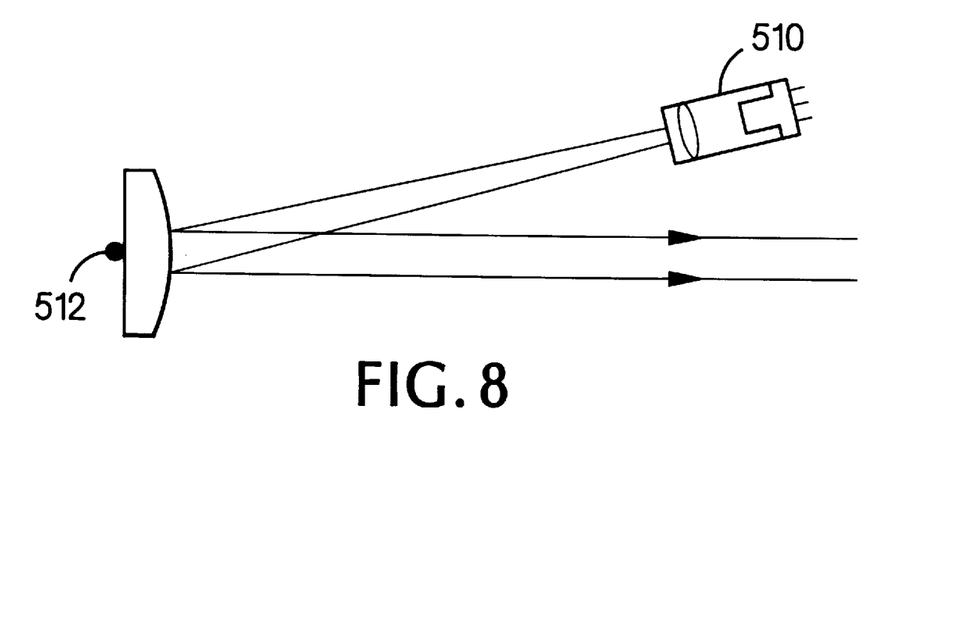
FIG. 8 is yet a further embodiment in which beam shaping is provided by a cylindrical scan mirror.

It will be understood that the segmented collector mirror shown in FIGS. 6 and 7 may be used in conjunction with any one of the other embodiments described in which a separate collector mirror is used. It would also be possible to use a segmented mirror of this type in a scanner in which the scanning mirror also acts as the collector. A further scanner embodiment is shown in FIG. 8. In this embodiment, the beam from a laser 510 is shaped by a cylindrical scanning mirror 512 before being directed to an indicia to be read (not shown). The cylindrical surface of the scanning mirror 512 allows the beam to be shaped, as desired, in the X direction.

Figure 9:
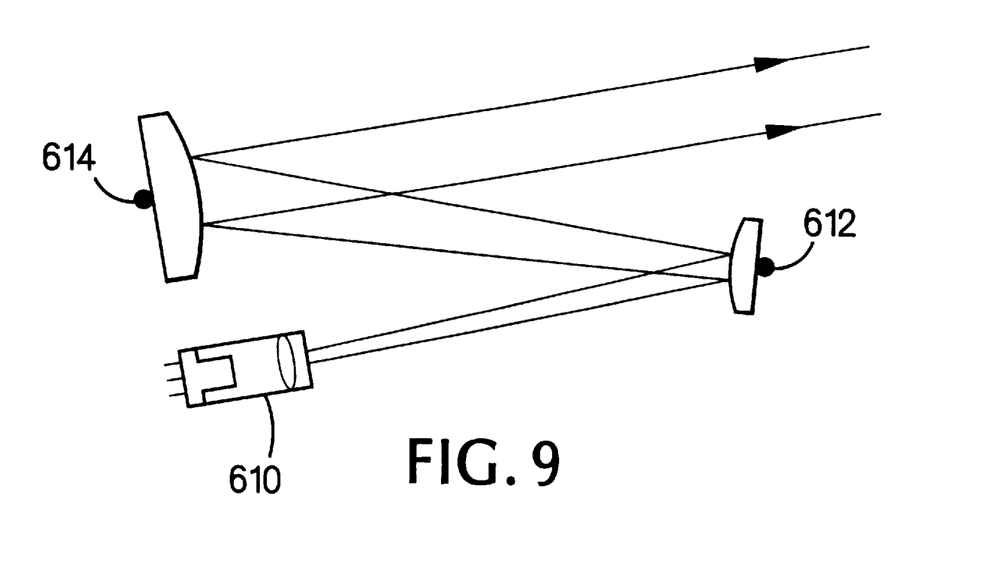
FIG. 9 is yet a further embodiment in which beam shaping in both the X and Y direction is provided by means of two cylindrical mirrors.

Another embodiment is shown in FIG. 9. Here, light from a laser 610 impinges upon a first scanning mirror 612 and a second scanning mirror 614. Both of the mirrors have a cylindrical surface, thereby shaping the beam as required in both the X direction and in the Y direction.

The exact mirror profile in FIGS. 8 and 9 may be chosen according to the beam shaping that is required. It may, for example, in some circumstances be useful to have a toroidal surface rather than a cylindrical surface. In addition, the shaping may be carried out by reflecting the light beam from one or more stationary mirrors either after or before the light has impinged upon a scanning element. In its most general form, beam shaping is carried out by reflecting the beam from one or more aplanar surfaces.

It will be understood that the embodiments described and illustrated with reference to FIGS. 8 and 9 above may be used on conjunction with any of the other embodiments.

Figure 10:
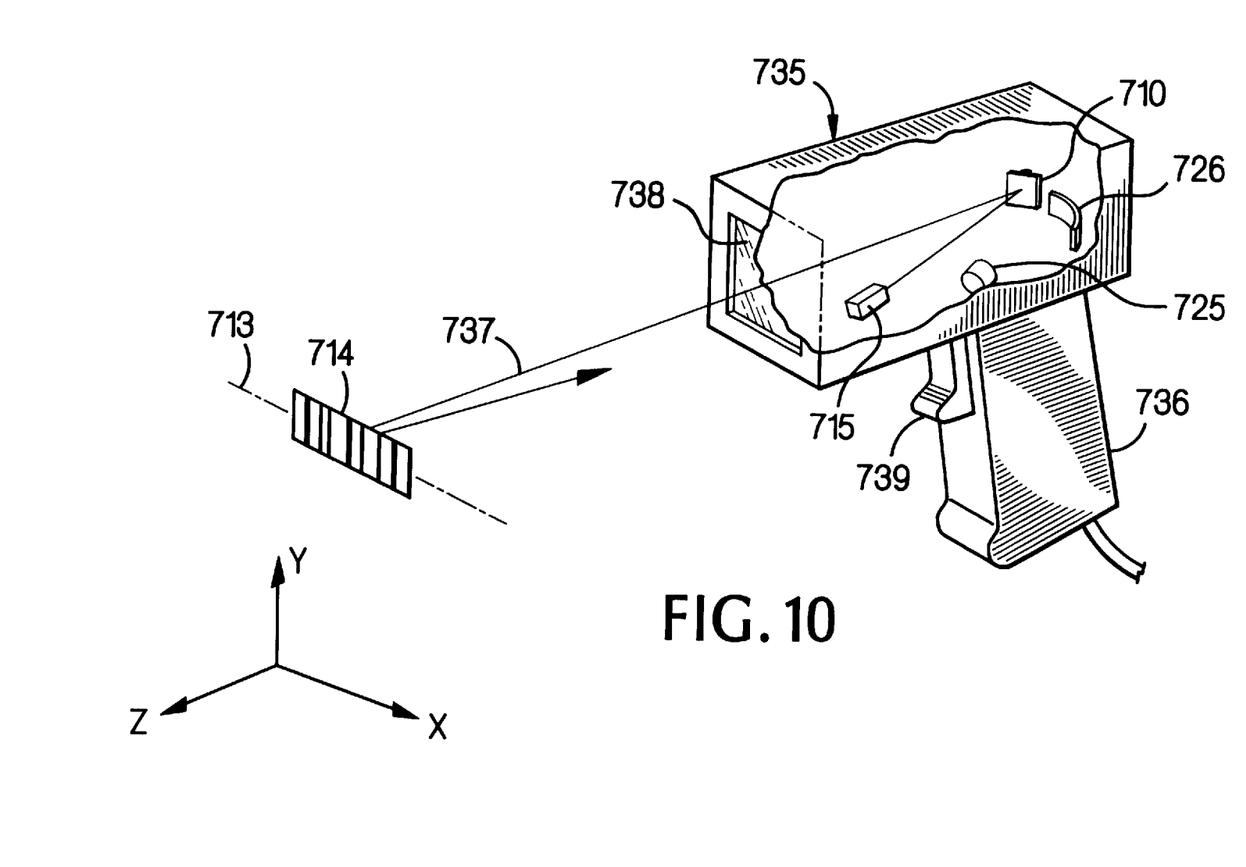
FIG. 10 shows a typical hand-held scanner within which any of the previous embodiments may be incorporated.

FIG. 10 illustrates, as an example, a suitable type of hand-held laser scanner into which any one of the previously described embodiments may be incorporated. The specific features incorporated within the scanner of FIG. 10 differ slightly in detail from the features already described with reference to FIGS. 1 to 9, but it will of course be understood that any of the embodiments described in connection with FIG. 9 could be incorporated within a hand-held scanner of the type shown in FIG. 10.

The scanner of FIG. 10 comprises a main body 735 having a graspable hand portion 736 which carries a trigger 739. Within the body 735 is a laser module 715. Light from the laser module 715 is arranged to shine onto to an oscillating mirror 710, which may for example be a mirror of the form shown in FIG. 2, FIG. 3, or FIG. 5. The resulting beam 737 passes out of the housing via a window 738. The mirror 710 is arranged to oscillate in such a way that the beam 737 traces out a scan line 713 across an indicia 714 to be recorded. Light reflected back from the indicia passes through the window 738, is collected by a collecting mirror 726, and is reflected to a photodetector 725. The optical signal is then converted into an electrical signal and the features of the indicia 714 determined.

While the invention has been illustrated and described with reference to a number of particular embodiments, it is not intended to be limited to any of the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the stand point of prior art, fairly constitute essential characteristics of the generic or specific aspects of this invention. Accordingly, such adaptations should be and are intended to be comprehended within the meaning and range of equivalence of the following claims.

What is claimed is:

1. An optical scanner for reading indicia having areas of different light reflectivity, comprising:
    light source for producing a light beam, the light source including a beam shaping optical element;
    a scanning optical element for receiving the light beam and producing a scanning outgoing light beam therefrom; and
    a multi-surface reflector having a first surface of a first profile and a second surface of a second profile,
    wherein the beam shaping optical element of the light source, the scanning optical element, and the first and second profiles of the multi-surface reflector together shape the light beam so that the scanner is adapted to read an indicia at a first distance when the beam is reflected from the first surface and at a second distance when the beam is reflected from the second surface;

wherein the multi-surface reflector comprises a fold mirror, the fold mirror being arranged to receive the scanning outgoing light beam and to direct it towards an indicia to be read.

2. A scanner as claimed in claim 1 in which the fold mirror also collects light reflected from the indicia to be read, and directs it to a photodetector.

3. A scanner as claimed in claim 1 in which the light from the first surface defines a first scan line and light from the second surface defines a second scan line, the first and second scan lines being in the same direction with respect to the scanner but adapted for reading an indicia at different distances.

4. A scanner as claimed in claim 3 in which, in use, the first and second scan lines alternate.

5. A scanner as claimed in claim 1 in which the first surface is planar.

6. A scanner as claimed in claim 1 in which the second surface is aplanar.

7. A scanner as claimed in claim 6 in which the second surface is cylindrical.

8. A scanner as claimed in claim 6 in which the second surface is toroidal.

9. A scanner as claimed in claim 1 in which the light source is a laser source and the beam shaping optical element comprises an optical element in the path of the light beam emerging from the laser source.

10. A scanner as claimed in claim 9 in which the optical element comprises a lens (38).

11. An optical scanner for reading indicia having areas of differing light reflectivity, the scanner including a movable scanning optical element and a multi-surface fold mirror having a first surface of a first profile and a second surface of a second, different, profile, wherein the fold mirror is stationary relative to the movable scanning optical element.

* * * * *

UNITED STATES PATENT AND TRADEMARK OFFICE
CERTIFICATE OF CORRECTION

PATENT NO. : 5,859,417
DATED : January 12, 1999
INVENTOR(S) : Paul Dvorkis, Edward Barkan, Howard Shepard, Vladimir Gurevich, Mark Krichever, Boris Metlitsky, David Tsi, Raj Bridgelall, Duanfeng He, Joseph Katz, Richard Isaac, and Joel Kahn It is certified that error appears in the above-identified patent and that said Letters Patent is hereby corrected as shown below:

Column 1,
Line 16, insert the following paragraph:
-- This application is also related to co-pending U.S. Patent Application Serial No. 08/452, 995, filed May 30, 1995 which is a divisional of Serial No. 08/098,243, filed July 29, 1993, now U.S. Patent No. 5,420,411, which was a continuation of Serial No. 07/717,770, filed June 14, 1991. --

Column 5,
Line 31, after "separate", delete "is".

Signed and Sealed this

Eleventh Day of December, 2001

*Attest:*

NICHOLAS P. GODICI
*Attesting Officer*    *Acting Director of the United States Patent and Trademark Office*